United States Patent [19]

Coulmance

[11] Patent Number: 4,614,843
[45] Date of Patent: Sep. 30, 1986

[54] ARRANGEMENT FOR OPENING THE LOOP FOR A WELL-DEFINED TIME INTERVAL FROM A TELEPHONE SET

[75] Inventor: Jean-Pierre Coulmance, Osny, France

[73] Assignee: U.S. Philips Corporation, New York, N.Y.

[21] Appl. No.: 671,526

[22] Filed: Nov. 13, 1984

[30] Foreign Application Priority Data

Nov. 14, 1983 [FR] France .................................. 83 18029

[51] Int. Cl.⁴ ............................................. H04M 1/00
[52] U.S. Cl. .................................................. 179/81 R
[58] Field of Search ................ 179/81 R, 99 H, 84 R, 179/84 A, 18 FA, 18 BD, 18 BE

[56] References Cited

U.S. PATENT DOCUMENTS

| 4,086,440 | 4/1978 | Hurle | 179/81 R |
| 4,251,693 | 2/1981 | Christiansen | 179/81 R |
| 4,313,037 | 1/1982 | Shepard | 179/81 R |
| 4,390,753 | 6/1983 | Janssen | 179/81 R |
| 4,492,823 | 1/1985 | James et al. | 179/81 R |

FOREIGN PATENT DOCUMENTS 2432452 7/1974 Fed. Rep. of Germany .... 179/81 R

Primary Examiner—Gene Z. Rubinson
Assistant Examiner—R. Vaas
Attorney, Agent, or Firm—Thomas A. Briody; William J. Streeter; Leroy Eason

[57] ABSTRACT

Telephone set with key for opening the loop for a predetermined time interval. A monostable triggering circuit includes an MOS transistor connected in series with the transmitter and dialing circuit and a bipolar transistor having a collector directly connected to the grid of the MOS transistor and a base connected to the drain of the MOS transistor through a capacitor and a diode. The capacitor together with a resistor connected in series therewith constitute a timing circuit. The voltage to which the capacitor is charged during the time that the circuit is open is limited by a Zener diode. Actuation of the key opens the MOS transistor thereby leaving the transmitting and dialing circuit disconnected. The transistor switches back to the conductive state when the timing capacitor has reached the voltage determined by the Zener diode. The MOS transistor is a low impedance in series with the transmitting and dialing circuit when conductive but presents a high impedance as its grid. The impedance seen by the line is thus not disturbed. An additional Zener diode and resistor for overvoltage protection is included.

8 Claims, 3 Drawing Figures

ARRANGEMENT FOR OPENING THE LOOP FOR A WELL-DEFINED TIME INTERVAL FROM A TELEPHONE SET

BACKGROUND OF THE INVENTION

1. Field of the Invention

The present invention relates to an arrangement for causing, from a telephone set, opening of the subscriber loop for a well-defined time interval in response to the actuation of a special key of the set which renders a predominantly capacitive control link operative. This arrangement comprises inter alia a diode bridge which ensures a fixed polarity of end portions of the line wires downstream of the hook, at least one transmission and dialling circuit, and a monostable pulse circuit for opening the loop. The monostable circuit comprises at least a first transistor of the bipolar type which controls a second transistor which is normally conductive and whose main current path is arranged in series with at least one of the transmission and dialling circuits, provided at the end of the end portions of the line wires for normal closure of the loop. The time interval during which the loop is open is determined by the time constant produced by a timing resistor arranged in series with a timing capacitor which is charged to a voltage defined by a Zener diode, whilst the end of the loop opening interval is defined by an end-of-charging voltage which is less than the zener voltage.

2. Description of the Prior Art

Such an arrangement is disclosed in French Patent Application No. 2471704.

It is known that novel electronic automatic changeover devices provide additional services to the telephone subscribers, such as the indication that a call is being established, a conference with three participants, call-back facility, etc. In order to get access to these services, it is necessary that one can return from the communication phase to the dialling phase, which operation is controlled from the subscriber set and requires a specific signal to be transmitted over the line. This signal consists in opening the loop for a predetermined interval during given limits, for example: 270 ms, plus or minus 50 ms.

It should be noted that a certain number of complementary requirements must also be satisfied during the operation of such an arrangement, so that the feasible technical solutions are not as simple as might be expected at a first glance.

It is indeed necessary to remain within prescribed limits for the duration of the pulse whatever the manner in which the relevant key has been actuated. On the other hand, during the interval in which the loop is open, the residual leakage current on the line must be very low, for example less than 200 μA, and this even when the line supply voltage is raised to approximately 100 V (in the case of lines with enhanced supply). Finally, outside the loop-opening period, the arrangement must not consume appreciable energy and must not disturb in any way the operation of the set, neither during the communication phase nor during the dialling phase. It is, more specifically, necessary that during the communication phase the characteristic impedance with which the line is loaded is not disturbed and also that at the beginning of the dialling phase, when voltage is applied to the circuit downstream of the hook, the arrangement does not introduce any additional delay for the current flow through the standardized line in the off-hook condition of the set.

SUMMARY OF THE INVENTION

One of the objects of the invention is to provide an arrangement for causing the loop to open for a well-defined time interval which satisfies all the above-mentioned technical requirements.

A further object of the invention is to provide an arrangement for which a change in the specific duration of loop opening can be effected in a simple and predictable way.

A still further object of the invention is to provide an arrangement whose construction is simple and by means of which it is possible, by slight modifications, to provide an additional overvoltage protection of certain circuits of the set.

To this effect, according to the invention, an arrangement as defined in the opening paragraph is characterized in that the second transistor is of the MOS field-effect type to whose grid said predominantly capacitive control link is connected, that the first and second transistors are coupled cross-wise on the one hand directly between the collector of a first transisttor and the grid of the second transistor, and on the other hand via a link which comprises the timing capacitor, between the drain of the second transistor and the base of the first transistor, and that said end-off charging voltage is limited by a Zener diode, called the end-of-charging limit.

The arrangement according to the invention has several advantages. In the first place, the second transistor can by virtue of its inherent properties, when it is in the conducting state, produce a very low impedance compared with the impedance of the transmission and dialling circuit, so that it will not disturb its function. It can be driven at a high impedance via its grid, so that the energy consumption on the line is so low as to be disregarded, to ensure this control and that the use of this arrangement within the telephone set does not change to any significant extent, either for the d.c. component or for the transmitted signal.

In the second place, the first transistor whose main function it is to control during the interval in which the loop is open the change to the non-conducting state of the second transistor, can for the same reasons be fed from the line, at a high impedance and will therefore consume only very little current during opening of the loop. On the other hand, since the arrangement operates with resistors having high resistance values, the timing capacitor whose value determines in combination with one of these resistors the interval during which the loop is open, is then of a rather low capacitance, which is advantageous as regards quality and price of this capacitor. Moreover, the interval during which the loop is open changes in a perfectly predictable way when the timing capacitor is simply replaced by a capacitor having a different value. Finally, the open loop interval induced by the arrangement according to the invention is accurately defined and reproducible because of the presence of first and second Zener diodes which prescribe operating voltages which are independent of the line supply voltages. The arrangement according to the invention can therefore be constructed and made operative without any special adjustment as regards the specific conditions of use of the telephone set in which this arrangement is incorporated. If the predetermined intervals during which the loop is open must vary from one sector to the other, because of differences inherent to the automatic change-over devices, it will be sufficient to arrange a timing capacitor of an adequate value within the arrangement to have it satisfy the local requirements.

In a first embodiment of the invention, the end-of-charging limit Zener diode is arranged in parallel with the Zener diode which defines the charging voltage between the end portions of the line wires and comprises at least one current-limiting resistor or a high value, arranged in series.

In a second embodiment of the invention, the end-of-charging Zener diode is arranged between the end portions of the line wires in accordance with a series branch circuit which comprises the Zener diode which defines the charging voltage, as well as at least one high-value current limiting resistor.

If the first embodiment requires the use of two Zener diodes having different control voltage, for example 12 and 24 Volts, it is in contradistinction therewith possible to choose for the second embodiment two Zener diodes of the same values, the voltage required for charging the timing capacitor then being double the end-of-charge voltage for this capacitor.

By slightly modifying the structure of the above-defined arrangement, an additional function as regards the protection against overvoltages can be ensured by the arrangement according to the invention.

An advantageous embodiment of the invention is characterized in that there is provided between the emitter of the first transistor and the source of the second transistor, in the end portion of the corresponding line wire, a current-measuring resistor whose value is chosen such that on the one hand, in normal operating conditions, the voltage drop developed across this resistor by the current flowing through the transmission and dialling circuit, which voltage drop is transmitted at least partially to the terminals of the base-emitter path of the first transistor, is insufficient to render this transistor conductive whilst, on the other hand, at an overcurrent which exceeds a predetermined limit value, the first transistor becomes conductive and thus induces a well-defined opening of the loop on the line, optionally followed by other loop opening cycles when the overcurrent continues. Thus, the arrangement ensures a protection against an excess of current which might damage the transmission and dialling circuit due to overheating.

In accordance with a further variation of this embodiment, the arrangement is inter alia characterized in that a protective Zener diode is arranged between the end portions of the line wire, in series with a limiting resistor, and also with the base-emitter path of the first transistor, this protective Zener diode having an operating voltage which is in a direct ratio with a safety limit voltage, so that in the event of overvoltage on the line exceeding this limit voltage, the first transistor becomes conductive and causes the loop to open for an interval which is at least equal to the duration of the overvoltage. An additional protection is thus ensured in accordance with this variation, which takes the value of the voltage at the end portions of the line into account and, more specifically, prevents the power dissipated by the second transistor from exceeding a predetermined value when an accidental overvoltage is produced on the line.

The following description given by way of example with reference to the accompanying drawings will make it better understood how the invention can be put into effect.

BRIEF DESCRIPTION OF THE DRAWING

FIG. 1 shows the terminals 1 and 2 which are connectable to the wires of a telephone line via a double "hook" interrupter (not shown in the Figure). Thus, the circuit diagram of this Figure relates to arrangements and circuits of a telephone set which are associated with endportions of the line wires downstream of the hook. The terminals 1 and 2 are connected to a diode bridge 3, which ensures a fixed polarity of the end-portions 4 and 5 of the line wires. In the example shown in the Figure, the end portion 4 is, during operation, in the positively polarized state relative to the end portion 5, which is assumed to be the reference potential. A transmission and dialling circuit 8, which is, for example in the form of an integrated circuit produced in accordance with a known printed circuit technique is connected by means of its positive terminal to the end portion 4. An arrangement for inducing opening of the loop during a well-defined time interval is enclosed in a broken-line box and the whole assembly is denoted by the reference numeral 10. A first terminal 11 of this arrangement is connected to the end portion 5, a second terminal 12 to the end portion 4, and a third terminal 13 to the negative terminal of the transmission and dialling circuit 8.

Figure 1:
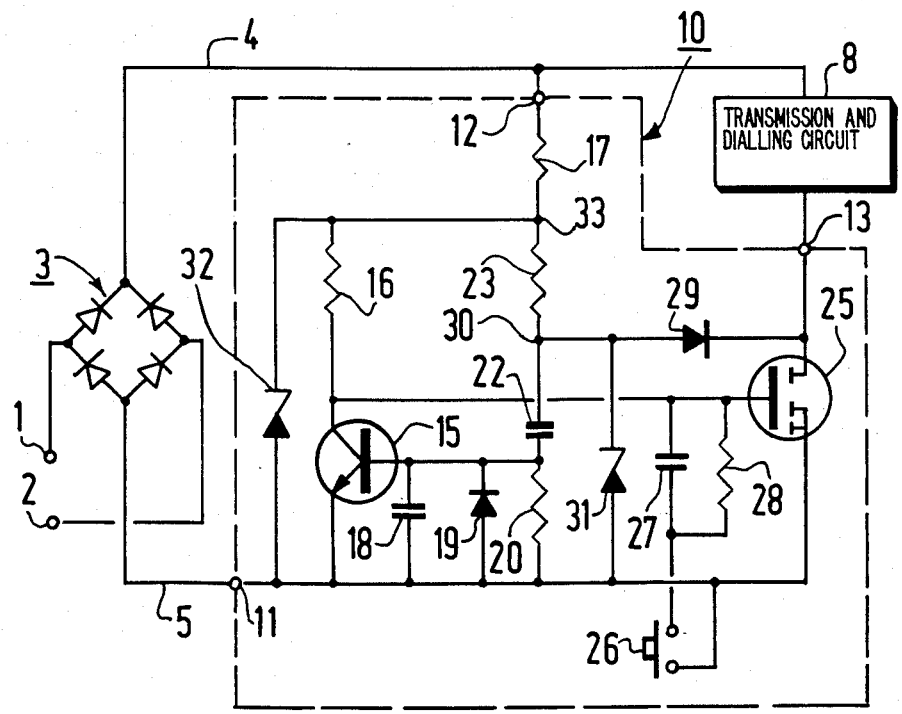
FIG. 1 shows a circuit diagram of a first embodiment of the arrangement according to the invention.

The arrangement 10 comprises a first transistor 15 of a bipolar type, here an NPN-transistor, whose emitter is connected to the terminal 11, the collector to the terminal 12 via two series-arranged resistors, namely the resistors 16 which functions as a collector resistor, and the resistor 17. The base of the first transistor is connected to the end portion of the line which is used as a reference, via a parallel branch circuit of a capacitor 18, a diode 19 and a resistor 20, and also to the terminal 12 via a series branch circuit comprising, arranged one after the other: a timing capacitor 22, a timing resistor 23 and the resistor 17, the last-mentioned resistor thus being common to the biasing branch of the collector and to the biasing branch of the base of the transistor 15. This transistor acts as a control component for a second transistor 25, which is of the MOS field effect type, here a N-channel transistor, which is chosen such that its source-drain path is distinctly conductive when a grid-source voltage of some volts (3 volts, for example) is applied to it and becomes non-conductive when this voltage is equal to (or lower than) zero volts. The source of the second transistor is connected to the end portion of the line which is used as a reference and is connected to a terminal 11, whilst the drain is connected to the end portion 4 via the terminal 13 and across the transmission and dialling circuit 8. The source-drain path of the second transistor 25 is consequently arranged in series with the circuit 8 between the end portions 4 and 5 of the line wires. The grid of this second transistor receives the command for a well-defined opening of the loop from an interrupter key 26 which causes, when it is depressed, this grid to be connected to the reference potential by an essentially capacitive link which comprises the parallel arrangement of a capacitor 27 and a resistor 28.

The first and second transistors 15 and 25 are arranged such that they form a monostable trigger circuit by means of cross-coupling, on the one hand directly between the collector of the first transistor 15 and the grid of the second transistor 25, and on the other hand by a connection between the drain of the second transistor and the base of the first transistor which includes the timing capacitor 22. This connection is realized by a diode 29, which has its cathode connected to the drain of the second transistor 25 and its anode to the node 30 of the base biasing branch of the first transistor 15, which node 30 is situated between the timing capacitor 22 and the timing resistor 23. Finally, the arrangement 10 is completed by a first Zener diode 31 connected between the node 30 and the reference end portion connected to the terminal 11, and by a second Zener diode 32 whose voltage exceeds the voltage of the first Zener diode, and is arranged between the node 33 and the reference end portion, the node 33 being the node which interconnects the resistors 17 and 23.

The arrangement shown in FIG. 1 operates as follows: from the moment voltage is applied to the end portions of the line 4 and 5, when the handset is lifted from the cradle, a positive voltage appears at the grid of the second transistor 25, which changes without any appreciable delay to the conducting state. This grid-biasing voltage is applied from the terminal 12 via the resistors 17 and 16. The potential of the node 30 relative to the reference potential of the terminal 11, which initially is equal to zero (the capacitor 22 being discharged before voltage is applied to the line) increases by not more than the value of a direct voltage drop across the diode 29. Actually, the second transistor 25 being conductive and the circuit 8 behaving substantially as a Zener diode, the drain potential is very near to the reference potential. Ultimately, biasing the grid of the transistor 25 is determined by the fraction of the line voltage in the closed-loop condition on the circuit 8, which is formed by the divider bridge constituted by the resistors 17 and 23, and increased by the voltage drop across the diode 29. It is easy to provide a suitable ratio between the values of these resistors, so that this grid biasing corresponds to a conducting state of the second transistor, for which the conduction resistance ($R_{ON}$) is sufficiently low, for example less than a dozen of ohms for a grid-source biasing of the order of 3 volts.

From the moment voltage is applied to it, the first transistor 15 cannot change to the conducting state because of the action of capacitor 18, which was previously discharged by the resistor 20.

By depressing the interrupter key 26, the loop of the telephone line is forced to open. The capacitor 27, which was previously discharged by the resistor 28 arranged in parallel therewith, forces the grid biasing voltage of the transistor 25 to zero potential relative to the reference, at least during a short instant which is sufficiently long to cause this transistor to stop conducting. The transmission and dialling circuit 8 is disconnected from the line as the impedance between the terminals 13 and 11 becomes too high. The diode 29, now reverse-biased, prevents current from circulating from the terminal 13 by-passing the transistor 25. The line being open, its end portions are adjusted to the line supply voltage, which may be different depending on the circumstances, but always exceeds 40 volts. This voltage, which is applied as a positive value to the terminal 12 is reduced to a predetermined value, for example 24 volts, by the action of the resistor 17 and the second Zener diode 32, so that the voltage provided by the node 33 is fixed at this value of 24 volts during the whole period of time in which the loop is open. The timing capacitor 22 is charged via the timing resistor 23. The resistor 20 is chosen to have a value which is sufficiently high to ensure that the main portion of the charging current of timing capacitor 22 circulates through the base-emitter junction of the first transistor. This transistor changes to the saturated state and contributes towards the control to zero voltage of the grid of the second transistor 25. The charging voltage of the timing capacitor increases in a highly exponential way and, after an easily to be determined period of time, reaches the control voltage of the first Zener diode 31, which voltage may, for example, be rated at 12 volts.

At this instant, the base current of the first transistor 15 is cancelled and the increase of the voltage at its collector determines the change of the second transistor 25 to the conducting state. This mechanism is accelerated from the moment at which the drain voltage of the second transistor decreases to a sufficient extent to render diode 29 conductive and contributes to discharging the capacitor 22.

During this phase, the base of the first transistor 15 is prevented from being subjected to a comparatively high reverse voltage by a diode 19, which is arranged such that it is directly biased during this fast phase in which a return is made to the closed loop conditions of the line.

It should be noted that the return to the closed line conditions depends somewhat on whether the control key 26 is depressed for a very short or a longer time. Actually, for the case in which the key is kept depressed for a time which exceeds the duration of the defined time delay, the control of the grid of the second transistor is delayed by the charge of the capacitor 27 via resistor 16. It is however very easy, by the choice of the values for these components, to proceed thus, that in all circumstances the loop opening interval remains within the specified tolerances, it being possible that any delay of the control of the grid of the second transistor may be sufficiently small relative to the duration of the defined time delay, that is to say the delay which is determined by the return from the conducting to the non-conducting state of the first transistor 15.

Obviously, the resistor 28 must be chosen to be of a sufficiently high value, relative to the resistor 16, to ensure that even though the key 26 may be depressed for a period of time which exceeds the defined time delay that will not prevent control of the grid of the second transistor by the positive voltage applied thereto at the end of the delay.

The main advantage of the described arrangement, in which the second transistor is of the MOS insulated grid type is in the fact that it is possible to use resistors 16, 17, 23 of a very high value, of the order of magnitude of 1 Mohm or more. The impedance seen by the line between the terminals 12 and 11 consequently remains high in all circumstances and, more specifically, during the loop opening cycle. The value of the timing capacitor 22 can be determined very easily in combination with the timing resistor 23 as these two components determine, for the major part, the loop opening interval obtained by the arrangement, taking account of the ratio chosen between the voltages of the first and second Zener diodes 31 and 32. In practice, the value of the timing capacitor 22 may be less than 1 µF for time delays which do not exceed 0.5 second, so that this capacitor may be of a good quality for a moderate price.

Figure 2:
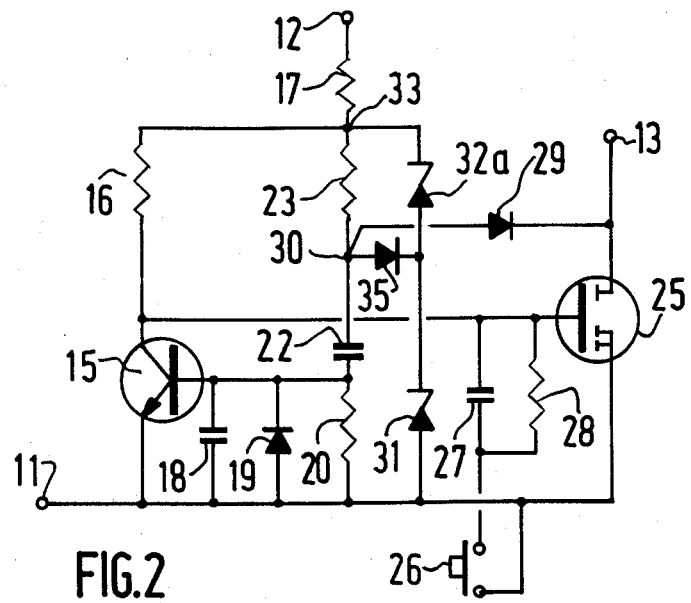
FIG. 2 shows a circuit diagram of a second embodiment of the arrangement according to the invention, which is a variation of the embodiment shown in FIG. 1.

Now FIG. 2 which shows the circuit diagram of a variation of the arrangement 10 of FIG. 1 will be described. In FIG. 2, the components having the same functions as those in FIG. 1 are given the same reference numerals. The arrangement shown in FIG. 2 differs from the arrangement shown in FIG. 1, in which the first and second Zener diodes 31 and 32 are arranged in parallel between the end portions of the line wires taking account of the fact that the resistor 17 is arranged in series with these diodes and that the resistor 23 is also arranged in series relative to the first diode 31, in that the first Zener diode 31 and the second Zener diode 32a are provided between the end portions of the line wires (11 and 12) in accordance with a series circuit which includes the current limiting resistor 17. The voltage at node 33 is then defined by the sum of the control voltages of the Zener diodes 31 and 32a. One has therefore the option to choose, if so desired, diodes having characteristics which are similar to those of diodes 31 and 32a, which has some advantages, more specifically as regards the stability of the voltage ratio obtained as a function of temperature, at the nodes 30 and 33. In FIG. 2, a diode 35 is arranged between the node 30 and the common point of the two Zener diodes 31 and 32a, which has for its object to resist the charge of the timing capacitor 22 by the second Zener-diode 32a during the loop opening cycle.

Figure 3:
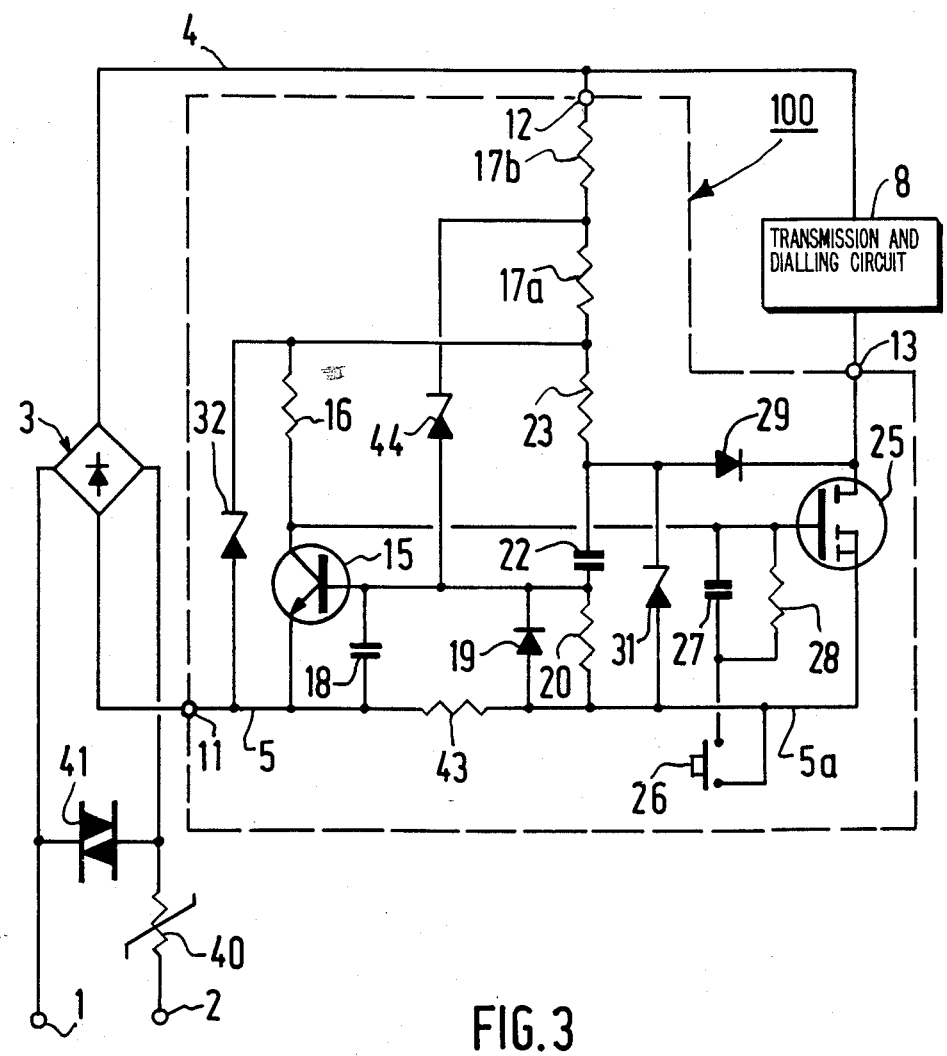
FIG. 3 shows the circuit diagram of a further embodiment of the invention in which the arrangement inter alia provides a protection against overvoltages.

The circuit diagram of FIG. 3 relates to a further embodiment of the invention in which, by slight modifications of the arrangements described in the foregoing, it is possible to obtain an additional protection against overvoltages on the telephone set produced by inadvertent overvoltages on the line. Put more accurately, the circuit diagram of FIG. 3 has predominantly the same components and arrangements of the circuit shown in FIG. 1, and the components they have in common have been given the same reference numerals. Provided between the connecting terminals of the line, 1 and 2, and the diode bridge 3 there is a non-linear positive temperature coefficient resistor 40 arranged in series with one of the wires of the line, and a voltage peak clipper 41, arranged in parallel with the line. These two components 40 and 41 ensure a primary protection of the circuits of the telephone set in accordance with a known technique. The arangement 100 for opening the loop of FIG. 3 is provided within the telephone set in the same way as in arrangement 10 of FIG. 1, from its terminals 11, 12 and 13. As shown in the circuit diagram of FIG. 3, the end portion 5 of the line wire, which is used as a potential reference, is interrupted between the emitter of the first transistor 15 and the source of the second transistor 25, and a resistor 43 having a comparatively low value is inserted there. Put more accurately, the position of the resistor 43 has been chosen such that the second Zener diode 32, the emitter of the first transistor 15 and the capacitor 18 continue to be directly connected to the terminal 11. In contradistinction therewith, the return paths to the reference potential of the diode 19, the resistor 20, the first Zener diode 31, the interrupter key 26 and the drain of the second transistor 25 flow through the resistor 43 to reach the terminal 11. This return path constitutes a section 5a which is separated from the end portion of line 5. The voltage drop across the terminals of the resistor 43 enables a measurement of the current flowing through the transmission and dialling circuit 8, since this current is several orders of magnitude larger than the other currents flowing through the section 5a. This voltage drop is transferred to the terminals of the baseemitter path of the first transistor 15, on the one in an almost instantaneous manner via the diode 19, and on the other hand with a delay via the resistor 20, which has a comparatively high value, and the charge of the capacitor 18. The value of the resistor 43 is chosen such that, in normal operating conditions, the voltage drop produced at its terminal will be insufficient to render the first transistor 15 conductive. When there is a disturbance on the line resulting in the flow of an excess current in the transmission and dialling circuit 8, the transistor 15 is rendered conductive and controls the opening of the loop, thus protecting the circuit 8 from being destroyed by an excess of current. If, at the end of the opening cycle thus triggered, the disturbance has disappeared, the set assumes again its normal operating conditions. If, in contrast therewith the disturbance persists, from the moment at which the loop is closed again after the first opening, a second loop opening cycle is immediately triggered, followed by further successive cycles when the overvoltage conditions have not ended. The transmission and dialling circuit 8 and the second transistor 25 are only subjected to a current which exceeds the predetermined limit during short pulses which are spaced apart by the normal interval of the loop opening cycle, that is to say in accordance with a small rate of recurrence, which protects the circuit 8 and also the transistor 25. This protective function thus obtained is provided in addition to the primary protection accomplished by the components 40 and 41, these latter components being provided to prevent electric overvoltages of a high value from being introduced in the telephone set, but allow the subsistence of operating conditions which entail the risk of deterioration of the circuits of the set.

Advantageously, an additional protection based on the detection of line overvoltages which the primary protection system was not capable of blocking, can be combined with the protection against overvoltages using the means described in the foregoing. Such an additional protection is also introduced in the arrangement 100 of FIG. 3. It consists in dividing in two series-arranged resistors 17a and 17b the impedance which limits the current of the second Zener diode 32 and to connect a third Zener diode 44 between the junction of the resistors 17a and 17b and the base of the first transistor 15. This Zener diode 44 has for its object to provide a control voltage which is in a linear relationship with the voltage level which is considered as being the safety limit, taking account of the voltage reduction ratio produced by the resistors 17a and 17b which form the resistance bridge. When an overvoltage appears at the terminals of the end portions 4 and 5 of the line, and if this overvoltage exceeds the predetermined safety limit, the second Zener diode 44 applies a current to the base of the first transistor 15, which causes the second transistor 25 to become non-conductive, which state is liable to maintain itself to beyond a normal delay time for the duration of the overvoltage. Combining the additional protections against the excessive currents by means of the resistor 43, and against overvoltages by means of the Zener diode 44, limits the power applied to the transmission and dialling circuit 8 as well as to a second transistor 25 in all the electric overvoltage conditions of the line.

It will be obvious that the arrangement 100 shown in FIG. 3, which comprises an arrangement of the Zener diodes 31 and 32 of the parallel type in accordance with the example shown in FIG. 1 might alternatively be realized with series-type arrangements of these diodes, as described with reference to FIG. 2.

Other modifications or variations relative to the described examples, bearing more specifically on the inversion of the polarities of the diodes and the transistors of the arrangement, which can be easily conceived by a person skilled in the art, nevertheless remain within the scope of the invention as defined in the attached claims.

What is claimed is:

1. Telephone set apparatus for opening a subscriber loop for a predetermined time interval in response to actuation of a special key, comprising
    bridge circuit means for furnishing a DC voltage between a reference potential terminal thereof and a supply terminal thereof;
    a transmission and dialing circuit connected to said bridge circuit;
    a monostable pulse circuit connected to said key, said bridge circuit and said transmission and dialing circuit, for opening said loop in response to said actuation of said key, said monostable pulse circuit comprising a junction transistor having a base, emitter and collector, an MOS field effect transistor having a grid directly connected to said collector, a source connected to said emitter and a drain connected to said transmitting and dialing circuit, means connecting said junction and MOS transistors to said bridge circuit so that said junction transistor is blocked, thereby switching said MOS field effect transistor to a highly conductive state, upon application of voltage to said bridge circuit, said monostable pulse circuit further comprising a timing capacitor connected between said base of said junction transistor and said drain of said MOS field effect transistor and which is charged by said source when said MOS field effect transistor becomes non-conductive, and a charge limiting Zener diode connected in parallel with said timing capacitor for ending the charging thereof when the voltage across said capacitor substantially reaches the Zener voltage of said Zener diode;
    said key having first and second terminals, the first terminal thereof being connected to said reference potential terminal of said bridge circuit means;
    and said monostable pulse circuit further comprising means connecting said grid of said MOS field effect transistor to said second terminal of said key so that activation of said key switches said MOS field effect transistor to a substantially non-conducting blocked state, thereby disconnecting said transmitting and dialing circuit from said bridge circuit, and initiating charging of said timing capacitor.

2. Apparatus as set forth in claim 1, wherein said bridge circuit furnishes a varying voltage; and
    wherein said monostable pulse circuit further comprises means connected in parallel with said bridge circuit for limiting the voltages applied to the base of said junction transistor and to the grid of said MOS field effect transistor to a predetermined maximum value.

3. Apparatus as set forth in claim 2, wherein said means connected in parallel with said bridge circuit comprises a voltage limiting Zener diode.

4. Apparatus as set forth in claim 3, further comprising a resistor connected in series with said charge limiting Zener diode, said charge limiting Zener diode and series resistor being connected in parallel with said voltage limiting Zener diode.

5. Apparatus as set forth in claim 3, wherein said voltage limiting Zener diode and said charge limiting Zener diode are connected in series to one another.

6. Apparatus as set forth in claim 1, further comprising overvoltage protecting means for switching said junction transistor to the conductive state, thereby opening said loop, upon occurrence of overvoltages on said line.

7. Apparatus as set forth in claim 6, wherein said overvoltage protecting means comprises a resistor connected between said emitter of said junction transistor and said source of said field effect transistor.

8. Apparatus as set forth in claim 7, wherein said overvoltage protecting means comprises a Zener diode.

* * * * *